United States Patent [19]
Thorwart et al.

[11] Patent Number: 6,098,517
[45] Date of Patent: Aug. 8, 2000

[54] ROTARY LINEAR UNIT

[75] Inventors: Gerhard Thorwart, Filderstadt; Albrecht Wagner, Winterbach, both of Germany

[73] Assignee: Festo AG & Co, Esslingen, Germany

[21] Appl. No.: 09/164,847

[22] Filed: Oct. 1, 1998

[30] Foreign Application Priority Data

Oct. 25, 1997 [DE] Germany ............... 297 19 015 U

[51] Int. Cl.[7] ..................................... F01B 7/04
[52] U.S. Cl. ................. 92/68; 92/65; 92/121; 92/136
[58] Field of Search ............... 92/65, 68, 120, 92/121, 136; 91/61; 173/105

[56] References Cited

U.S. PATENT DOCUMENTS

| | | |
|---|---|---|
| 2,893,210 | 7/1959 | Muszynski . |
| 3,302,469 | 2/1967 | Ortelli . |
| 5,367,943 | 11/1994 | Stoll et al. ............... 92/2 |
| 5,404,983 | 4/1995 | Eicher et al. . |

FOREIGN PATENT DOCUMENTS

| | | |
|---|---|---|
| 42 01 827 C1 | 6/1993 | Germany . |
| 42 29 989 C1 | 3/1994 | Germany . |
| 13 59 971 | 7/1994 | United Kingdom . |

*Primary Examiner*—Edward K. Look
*Assistant Examiner*—Thomas E. Lazo
*Attorney, Agent, or Firm*—Hoffman & Baron, LLP

[57] ABSTRACT

A rotary linear unit possesses a rotary drive and a linear drive. A bearing rod is connected with the drive shaft of the rotary drive, such bearing rod extending coaxially into the output drive unit of the linear drive. On the bearing rod a bearing sleeve is mounted so that it may not rotate while being axially displaceable, such sleeve being fixedly connected with the piston of the linear drive. The piston is divided into two axially sequential piston parts, between which the bearing sleeve is located, which extends into facing receiving recesses in the piston parts.

11 Claims, 2 Drawing Sheets

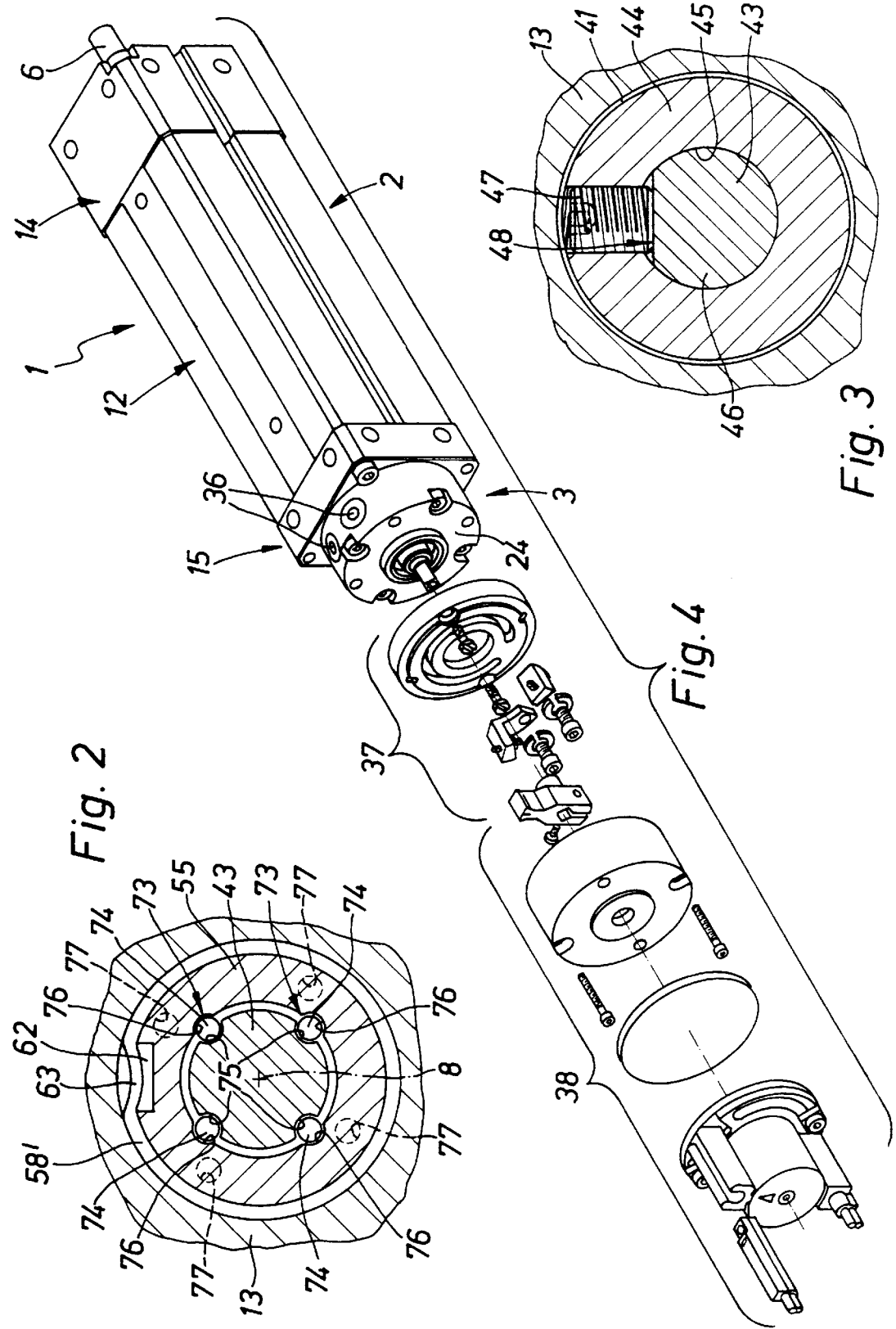

though it is usable at all, for smaller overall sizes at the sacrifice of more complex production techniques.

ROTARY LINEAR UNIT

BACKGROUND OF THE INVENTION

The invention relates to a rotary linear unit comprising a fluid operated rotary drive, which possesses a drive shaft adapted to be driven to perform a rotary movement and which is arranged on the rear side of a fluid operated linear drive, which latter possesses an output drive unit able to move axially and which simultaneously is coupled in a manner preventing relative rotation with the drive shaft of the drive unit, such output drive unit having a piston and an output drive rod, fixedly connected with the said piston, projecting from the front side of the linear drive.

THE PRIOR ART

A rotary linear unit of this type is disclosed in the German patent publication 4,229,989 A1. It renders possible the transmission of a rotary movement, a linear movement or a combined rotary and linear movement from the output drive rod to a load. The rotary movement is produced by a rotary drive, the linear movement by a linear drive. The coupling of the two drives is performed between the drive shaft of the rotary drive and the output drive unit, comprising a piston and an output drive rod, of the linear drive, the drive shaft being hollow so that a rod fixedly connected with the output drive unit may be withdrawn in a rotarily locked but axially sliding manner.

The design involved in the known rotary and linear unit is more especially suited for large overall sizes o equipment. It is only suitable, if at all, for smaller overall sizes at the sacrifice of more complex production techniques.

SHORT SUMMARY OF THE INVENTION

One object of the invention is to accordingly create a rotary linear unit of the type initially mentioned, which while possessing a reliable manner of operation and involving simplified manufacture renders possible production with smaller overall sizes.

In order to achieve these and/or other objects appearing from the present specification, claims and drawings, in the present invention a bearing rod fixedly connected with the drive shaft is provided, which in the interior of the linear drive coaxially extends into the output drive unit, on the bearing rod a bearing sleeve, which is fixedly connected with the piston of the linear drive, is mounted in such a manner as to prevent relative rotary motion while permitting at the same time axial movement and the piston is divided into two axially sequential piston parts which at mutually facing axial sides each possess a receiving recess, the bearing sleeve being arranged between the two piston parts and having respective portions of its length inserted into the receiving recesses.

It is in this manner that a rotary linear unit is provided in the case of which a specially adapted bearing sleeve may be employed in order to ensure the axially sliding while simultaneously rotarily locked coupling between the output drive unit and the drive shaft, such sleeve constituting a component of the piston of the output drive unit in order to form a compact structure. The piston is divided into two piston parts, more particularly in the form of identical piston halves, which accommodate the bearing sleeve between them.

Further advantageous developments of the invention are defined in the claims. As a bearing means, by means of which the bearing sleeve is guided for longitudinal movement on the bearing rod while at the same time preventing relative rotation, it is more particularly possible to use an anti-friction bearing means, which is particularly low in friction and free running and is conveniently in the form of a ball bearing means, for instance in the form of a ball circuit bearing means. More particularly in the case of small overall sizes of the rotary linear unit, in the case of which the fluid pressures necessary for driving the piston are relatively low, the free running properties of the guide without impairment of the accuracy of guidance play a significant role.

Special, separate attachment means are unnecessary, providing that the two piston parts are thrust from opposite axial sides firmly onto the bearing sleeve which is received in their receiving recesses. In addition to this purely frictional connection it is possible if necessary to provide a complementary interlocking connection as a safety measure, for example in such a manner that the peripheral wall, defining the receiving recess, of the piston parts is dented at one or more points into an associated holding recess provided on the bearing sleeve.

It is more particularly the above mentioned measures which render it possible to do without a direct connection between the piston parts and to hold the piston together using the intermediately placed bearing sleeve. The piston parts may even be arranged with an axial clearance between them, the bearing sleeve functioning as the connecting bridge member.

In the case of a further advantageous design of the rotary linear unit there is a provision such that the rotary drive constitutes the rear terminal cover of the linear drive. It is in this manner that it is possible to do without an additional terminal cover for the linear drive as disclosed in the German patent publication 4,229,989 A1 in the form of a flange plate called a terminal wall. This more especially renders possible small longitudinal dimensions for compactness as well. The terminal seal of the receiving space, accommodating the piston, of the linear drive may preferably be by means of a coupling sleeve, which connects the drive shaft and the bearing rod together with the rotary and translatory relative locking effect and which is inserted permitting rotary movement and with a sealing action in a housing tube of the linear drive.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 2 is a detailed view of the part of the rotary linear unit on a larger scale as sectioned along the line II—II of FIG. 1.

FIG. 3 shows a further detail, also on a larger scale, of the rotary linear unit as sectioned on the line III—III of FIG. 1.

FIG. 4 is a perspective showing of the rotary linear unit as in FIG. 1 looking toward the rear side having the rotary drive, an optionally provided angle of rotation setting means and also a position detecting means for the position of rotation of the drive shaft of the rotary drive being shown in a complementary manner in an exploded view.

DETAILED ACCOUNT OF WORKING EMBODIMENT OF THE INVENTION

Figure 1:
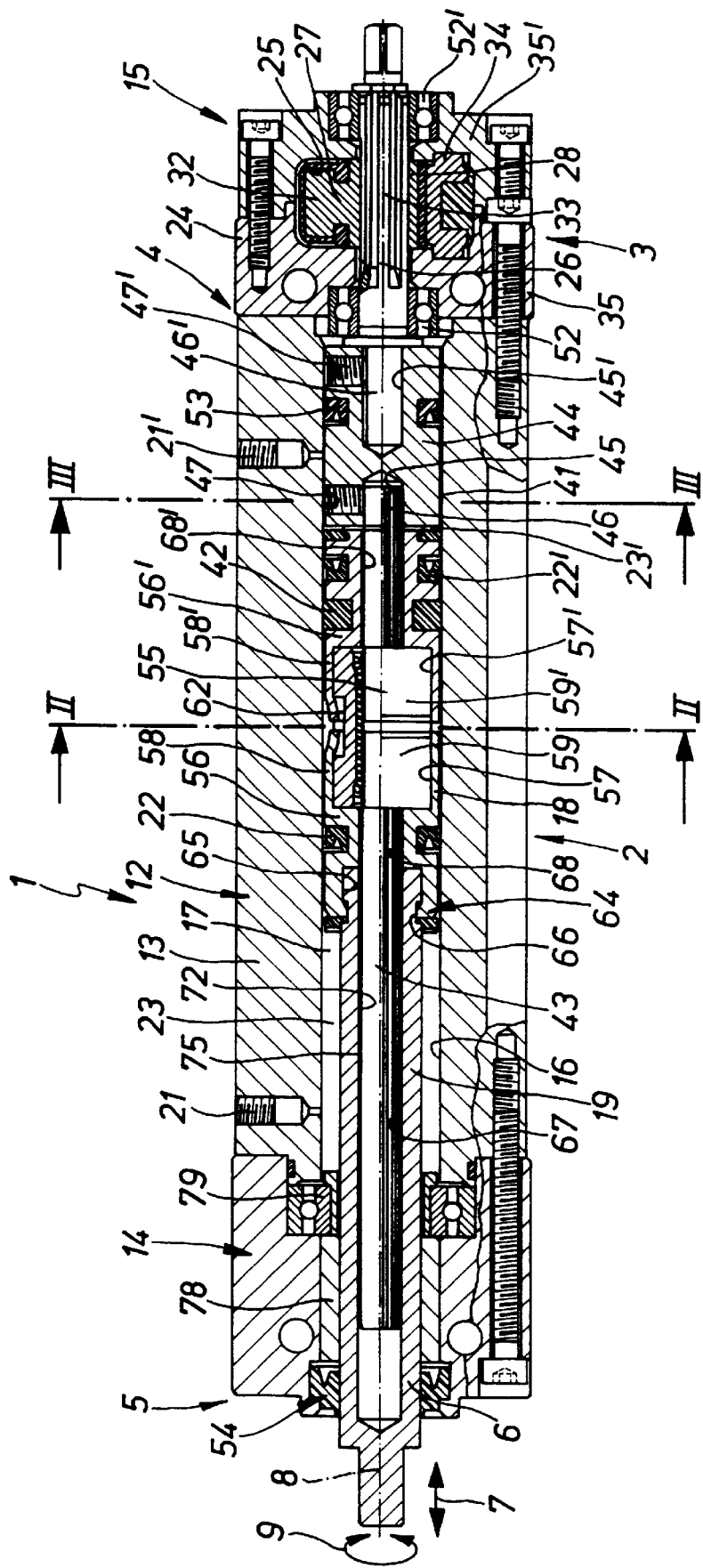
FIG. 1 shows a preferred embodiment of the rotary linear unit of the invention in a longitudinal section.

The rotary linear unit 1 depicted in the drawings includes a fluid operated linear drive 2 and a fluid operated rotary drive 3 in a single assembly. The rotary drive 3 is effectively located at the rear side 4 of the linear drive 2, from whose front side 5 an output drive rod 6 extends.

By separate or by combined actuation of the linear drive 2 and of the rotary drive 3 the output drive rod 6 may be driven selectively to perform translatory movement in the direction of the longitudinal axis 8 of the linear drive 2 and a rotary movement 9 about the said longitudinal axis 8. Linear motion in both longitudinal directions and rotary movement in the clockwise and in the counter-clockwise directions is possible. The respectively produced movement of the drive rod 6 may be applied to a component to be moved by connecting the rod therewith by a connecting means, not illustrated. It is in this manner that the respective component can be moved in translation, rotated or pivoted.

The linear drive 2 comprises a linear drive housing 12, which has housing tube 13, which axially at either end is provided with a front and a rear terminal cover 14 and 15. In the interior of the housing tube 13 there is a axially continuous housing recess 16, which defines a receiving space 17, wherein a piston 18 is accommodated for axial sliding motion. The piston 18 is fixedly connected with the output drive rod 6 and in common with same constitutes the output drive unit 19 of the rotary linear unit 1.

On the piston 18 two axially spaced out seal means 22 and 22' are provided, which operate between the piston 18 and the peripheral face of the receiving space 7. They effect a fluid-tight division of the receiving space 17 into two axially following working chambers 23 and 23', which communicate with connection ducts 21 and 21' leading to the outer face of the linear drive housing 12, via which ducts the fluid pressure medium, more particularly compressed air, may be supplied and removed in order to drive the piston 18 and accordingly the output drive unit 19 to perform a linear movement in the desired direction.

For the sake of having a particularly compact design the rotary drive 3 is mounted directly on the rear end face of the housing tube 13 and at the same time constitutes the rear terminal cover 15 of the linear drive 2. The rotary drive 3 is directly flange-mounted on the housing tube as a coaxial extension thereof.

The rotary drive 3 of the working embodiment is designed in the form of an oscillating pump drive. It possesses a rotary drive housing 24, which in its interior defines a piston chamber 25. A drive shaft 26 extends coaxially and centrally through the rotary drive housing 24 and an oscillating piston 27 is seated on it in a rotationally locked manner within the piston chamber 25. This oscillating piston 27 has a possesses a bushing portion 28 surrounding the drive shaft 26 and a vane portion 32 extending radially therefrom, the rotationally locking connection being ensured because the drive shaft 26 has external splines 33 which are in engagement with complementary internal splines in the bushing portion 28.

The oscillating piston 27 makes sealing engagement with the limiting face of the piston chamber 25, the bushing portion 28 furthermore cooperating in a sealing fashion with a partition wall 34, which at a point on the periphery is inserted in the piston chamber 25, which is circular in cross section. The partition 34 solid with the housing is also in sealing contact with the limiting face of the piston chamber 25.

In the piston chamber 25 the rotary drive housing 24 is divided up into two essentially plate- or disk-like housing parts 35 and 35'. The first housing part 35 is screwed directly to the end face of the housing tube 13, whereas the second housing part 35' is screwed fixedly to the first housing part. Furthermore it is convenient for the first housing part 35 to externally have a rectangular or more particularly square cross section, which is preferably the same as that of the housing tube 13 and of the front terminal cover 14. In the illustrated working embodiment the second housing part 35' part 35' possesses a cylindrical external surface.

Two connection openings 36 are provided in the rotary drive housing 24, which render possible the connection of external pressure medium lines. Each of the connection openings 36 communicates in this case with one of two actuation chambers, which the oscillating piston 27 divides from one another in the piston chamber 25. By suitable supply and removal of pressure medium, as for example compressed air, into and, respectively, from the actuating chambers it is possible for the oscillating piston 27 to be caused to perform a rotary movement about the longitudinal axis of the piston chamber 25 so that the drive shaft 26 performs a corresponding rotary movement. In the illustrated working embodiment rotary movements of the drive shaft 26 up to a maximum of 270° are possible.

With the aid of an angle of rotation setting means 37, which is mounted on the axial side opposite to the linear drive housing 24, it is possible to preset a given small angle of rotation steplessly within the above mentioned maximum angle of rotation range. A position detecting means 38, provided in addition on the rotary drive 3, renders possible the detection of a certain selected or instantaneous position of rotation of the drive shaft 26 and accordingly enables the integration of the rotary linear unit in a control system, in the case of which the operation of the rotary linear unit 1 is rendered possible, inter alia, in a manner dependent on the instantaneous angular position of the drive shaft 26 and of the drive rod 6, which is connected therewith in a manner yet to be explained preventing relative rotation. In this connection it is furthermore appropriate to provide a position detecting means, not illustrated, for the detection of the instantaneous axial position or of a given axial position of the output drive unit 19. Same may, for instance, comprise a permanent magnet means 42 arranged on the piston 18, and which can actuate a sensor means arranged on the outer periphery of the housing tube 13, the sensor signals being able to be taken into account in an associated control means in order to be able to actuate the rotary linear unit 1 as well in a manner dependent on the axial position of the output drive unit 19.

Between the output drive unit 19 and the drive shaft 26 there is a connection which on the one hand prevents relative rotation while on the other hand permits relative axial motion. The output drive unit 19 may consequently perform an axial linear movement in relation to the drive shaft 26 on suitable actuation of the piston 18. Furthermore the output drive unit 19 may be driven by suitable fluid actuation of the oscillating piston 27 of the rotary drive 3 to perform a rotary movement 9.

In order to produce this connection as described, a bearing rod 43, which is coaxial to the drive shaft 26, is present, which is fixedly connected with the drive shaft 26 and which extends from the rear portion of the housing recess 16 within same forward toward the front terminal cover 14. The bearing rod 43 could certainly be made integrally with the drive shaft 26, but however the separate design as in the working embodiment renders possible a simple adaptation to different overall lengths of the linear drive 2 using the same type of rotary drive.

The connection, which prevents both axial and also rotary relative movement, between the bearing rod 43 and the drive shaft 26 is in the illustrated working embodiment in the form of a coupling sleeve 44, which is seated in the rear terminal portion of the housing recess 16 directly adjacent to the rotary drive 3. It is able to rotate in relation to the housing recess 16, for which purpose a narrow concentric annular gap 41 is provided between the coupling sleeve 44 and the peripheral face of the housing recess 16. From both end sides there extends axially a respective blind hole 45 and 45' into the coupling sleeve 44, into which hole the mutually adjacent end sections 46 and 46' of the bearing rod 43 and of the drive shaft 26 are inserted. Since the end sections 46 and 46' and the associated blind holes 45 and 45' are provided with a complementary non-circular cross section (in the working example there is a circular form modified by having a flat at one point at least on the periphery, see FIG. 3), there is a generally play-free connection providing for rotary entrainment. In order to provide for the axially set connection each blind hole 45 and 45' is provided with a fastening screw 47 on the peripheral part, which screw is screwed into the coupling sleeve 44 and which may be clamped against the flat 48 of the end sections 46 and 46'.

The rotary bearing arrangement for the drive shaft 26 in the rotary drive housing 24 is by means of bearing means 52 and 52' arranged on either side of the piston chamber 25, such bearing means being more especially in the form of anti-friction bearing means. It is in this manner that there is no need for a transverse support means for the coupling sleeve 44. Same may however as illustrated be employed as a rear terminal part for the receiving space 17, if it is inserted in the housing recess 16 in a radially sealed manner. For this purpose it may be provided on the outer periphery with a concentric annular sealing means 53, which is in constant sealing contact with the peripheral face of the housing recess 16. In this case it is seated between the rear end of the housing tube 13 and the entry portion of the rear connection duct 21'. The fluid-tight seal for the receiving space 17 at the front terminal cover 14 is provided by an annular seal means 54, which is set in the front terminal cover 14 and surrounds the output drive rod 6 in a sealing fashion concentrically.

On the bearing rod 43 and within the receiving space 17 a bearing sleeve 55 is able to run, which is fixedly connected with the piston 18. The sleeve 55 surrounds the bearing rod 43 coaxially, it being able to move axially in relation to the bearing rod 43 and at the same time is prevented from rotating about the longitudinal axis 8.

The piston 18 is divided up into two axially sequential piston parts 56 and 56', which at their mutually facing axial sides respectively possess a receiving recess 57 and 57'. The cross sectional shape of the receiving recesses 57 and 57' is adapted to that of the bearing sleeve 55 so that the latter plunges into the receiving recesses 57 and 57' with mutually opposite length sections 59 and 59' therein. The bearing sleeve 55 is in this respect radially surrounded by cylindrical walls 58 and 58', which delimit the receiving recesses 57 and 57' peripherally, of the piston parts 56 and 56'.

The fixed connection between the bearing sleeve 55 and the piston is preferably produced by slipping the two piston parts 56 and 56' onto the bearing sleeve 55 from opposite axial ends and press fitting same in place in the bearing sleeve 55. It is in this manner that there is a connection between the bearing sleeve 55 and each individual one of the two piston parts 56 and 56' in an axially and rotationally fixed manner.

As a further means for fixing in position it is possible for the bearing sleeve 55 to have at least one holding recess 62 in its radially outwardly directed outer peripheral face, into which recess the overlying portion of the walls 58 and 58' is thrust radially. The thrust in portion is indicated in FIG. 2 by reference numeral 63. In this manner there is an interlocking action in addition.

The thrust-in or indented portions 63 are preferably located on the mutually opposite end portions of the walls 58 and 58', an axially central holding recess 62 being provided on the coupling sleeve 44 if desired, into which both walls 58 and 58' are simultaneously thrust locally.

Owing to the reliable press fit between the above mentioned components there is no need for an additional direct connection between the piston parts 56 and 56'. Same may even, as illustrated, be arranged on the bearing sleeve 55 with an axial distance apart. However they are preferably so designed that the length sections 59 and 59' of the bearing sleeve 55 occupied by them are of equal length.

The two piston parts 56 and 56' respectively bear one of the two seal means 22 and 22'.

In order to ensure simple and adaptable manufacture the output drive rod 6 is designed in the form of a component separate from the piston 18. It is fixedly anchored on the front piston part 56, which is associated with the front side, for which purpose in the illustrated working embodiment a crimped joint 64 is provided. The output drive rod 6 plunges into a axially extending recess 65 formed in the front end side of the respective piston part 56 and it possesses an encircling groove 66, into which the front edge part of the piston part 56 is thrust with the formation of a frictional and positive connection.

The output drive rod 6 possesses a coaxial recess 67 which is open toward the adjacent piston part 56 but which is closed at the opposite end, such recess 67 being aligned with coaxial through opening 68 and 68' in the two piston parts 56 and 56' and constituting a receiving means 72 with same, into which the bearing rod 43, starting at the coupling sleeve 44, extends to a greater or lesser extent axially dependent on the axial position of the output drive unit 19.

The bearing sleeve 55 could in principle be borne in a movable manner using a plain bearing means on the bearing rod 43. A better bearing or guiding means is however one in which the bearing means is in the form of an anti-friction bearing 73, whose bearing elements are constituted by rolling elements 74, which on axial displacement of the bearing sleeve 55 roll along the bearing rod 43. The anti-friction bearing means 73 provided in the working example is designed in the form of a ball bearing means and comprises balls as rolling elements 74.

As shown in FIG. 2 a plurality of longitudinally extending guide grooves 75 are formed in the bearing rod 43 with a spacing in the peripheral direction, the rolling elements 74 to run in. Radially opposite each guide groove 75 there is a bearing groove 76, which also extends linearly in the inner periphery of the bearing sleeve 55 so that individual channel-like guide sections are produced, in which the rolling elements 74 are held. This serves to ensure that a relative rotary movement between the bearing rod 43 and the bearing sleeve 55 is not possible about the longitudinal axis 8.

A communicating guide channel 77 is associated with each bearing groove 76 in the interior of the bearing sleeve 55. Together with the associated guide section defined respectively by a guide groove 75 and a bearing groove 76 the guide groove 77 defines a circuit or circulation channel, in which a plurality of anti-friction bearing elements 74 is accommodated. If the bearing sleeve 55 is displaced on the bearing rod 43, the anti-friction bearing elements may move in the circuit channel and thus roll along in the guide grooves 75 with minimum friction.

The output drive unit 19 is supported to the rear using the piston 18 radially in relation to the linear drive housing 12. In the front portion support is ensured for instance by means of a guide sleeve 78, which is held in the front terminal cover 14 and which surrounds the output drive rod 6, which is externally cylindrical, with a guiding action.

On the front end portion of the receiving space 17 there is furthermore a bearing 79 for allowing rotation, against which the piston 18 can abut in the extreme extended position of the output drive unit 19. It reduces frictional forces, when the output drive unit 19 in this position is driven to perform a rotary movement.

The transmission of the torque from the drive shaft 26 to the output drive rod 6 is performed via the coupling sleeve 44, the bearing rod 43, the bearing sleeve 55 and the front piston part 56. On fluid actuation of the piston 18 the output drive unit 19 is displaced axially, the bearing sleeve 55 running along the bearing rod 43 on its anti-friction bearing means 73.

What is claimed is:

1. A rotary linear unit comprising a fluid operated rotary drive, which possesses a drive shaft adapted to be driven to perform a rotary movement and which is arranged on the rear side of a fluid operated linear drive, which latter possesses an output drive unit able to move axially and which simultaneously is coupled in a manner preventing relative rotation with the drive shaft of the drive unit, such output drive unit having a piston and an output drive rod, fixedly connected with said piston, projecting from the front side of the linear drive, wherein a bearing rod fixedly connected with the drive shaft is provided, which in the interior of the linear drive coaxially extends into the output drive unit, on the bearing rod a bearing sleeve, which is fixedly connected with the piston of the linear drive, is mounted in such a manner as to prevent relative rotary motion while permitting at the same time axial movement and the piston is divided into two axially sequential piston parts which at mutually facing axial sides each possess a receiving recess, the bearing sleeve being arranged between the two piston parts and having respective portions of its length inserted into the receiving recesses.

2. The rotary linear unit as set forth in claim 1, wherein the bearing sleeve is supported on the bearing rod in a manner permitting axial movement while preventing rotation by means of an anti-friction bearing means more particularly in the form of a ball bearing means.

3. The rotary linear unit as set forth in claim 2, wherein the anti-friction bearing means is designed in the form of a bearing means with anti-friction elements moving in a circuit.

4. The rotary linear unit as set forth in claim 2, wherein the bearing rod connected in a manner preventing axial movement while allowing rotation with the drive shaft comprises one or more longitudinally extending guide grooves, into which the anti-friction bearing elements of the bearing sleeve so fit that on the one hand same prevent a rotary movement of the bearing sleeve in relation to the bearing rod and on the other hand roll in the guide grooves on axial displacement of the bearing sleeve.

5. The rotary linear unit as set forth in claim 1, wherein the two piston parts are firmly pressed onto the bearing sleeve, which is in their receiving recesses, from opposite axial sides.

6. The rotary linear unit as set forth in claim 1, wherein on its radially directed external peripheral face the bearing sleeve has at least one holding recess, into which the cylindrical wall, which delimits the receiving recess peripherally, of the piston parts is locally dented to form an interlocking connection.

7. The rotary linear unit as set forth in claim 1, wherein the two piston parts are only held together axially indirectly by means of the bearing sleeve.

8. The rotary linear unit as set forth in claim 1, wherein the output drive rod is a component separate from the piston, which is fixed on place of the piston part associated with it by a crimped connection.

9. The rotary linear unit as set forth in claim 1, wherein the drive shaft and the bearing rod are separate components which are connected with one another by an intermediately placed coupling sleeve in a manner preventing relative rotation.

10. The rotary linear unit as set forth in claim 9, wherein the coupling sleeve constitutes a rear closure part for the receiving space accommodating the piston, because it is mounted in a sealing and rotatable manner in the housing of the linear drive.

11. The rotary linear unit as set forth in claim 1, wherein the rotary drive constitutes the rear terminal cover of the linear drive.

* * * * *